United States Patent
Vook et al.

(10) Patent No.: US 11,555,887 B2
(45) Date of Patent: Jan. 17, 2023

(54) METHOD AND SYSTEM FOR GENERATING TRIGGER SIGNALS FROM RADAR SIGNAL

(71) Applicant: Keysight Technologies, Inc., Santa Rosa, CA (US)

(72) Inventors: Dieter W. Vook, Santa Clara, CA (US); Paul L. Corredoura, Redwood City, CA (US); Gregory S. Lee, Mountain View, CA (US); Jefferson B. Burch, Palo Alto, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 162 days.

(21) Appl. No.: 16/836,146

(22) Filed: Mar. 31, 2020

(65) Prior Publication Data
US 2022/0397661 A1    Dec. 15, 2022

(51) Int. Cl.
*G01S 7/40*     (2006.01)
*G01S 7/03*     (2006.01)
*H01Q 1/32*     (2006.01)

(52) U.S. Cl.
CPC .............. *G01S 7/4004* (2013.01); *G01S 7/03* (2013.01); *H01Q 1/3233* (2013.01)

(58) Field of Classification Search
CPC ....... H01Q 1/3233; G01S 7/4004; G01S 7/03; H04B 17/0085; H04B 17/16; H04L 1/244
See application file for complete search history.

(56) References Cited

U.S. PATENT DOCUMENTS 2,942,257 A * 6/1960 Huntington ........... G01S 7/4086
                                                342/165
5,920,281 A * 7/1999 Grace ................... G01S 7/4052
                                                342/165

FOREIGN PATENT DOCUMENTS

KR     20130056030 A  *  5/2013
KR       101827954 B1 *  2/2018

OTHER PUBLICATIONS

"Radar Testing with Simulation Signals", Anritsu, Part No. 11410-00752, Revision: A, Nov. 2013. pp. 1-32.
Sandeep Rao, "Introduction to mmwave Sensing: FMCW Radars", Texas Instruments, Nov. 1, 2019, pp. 1-70.
Sandeep Rao et al., "The Fundamentals of Millimeter Wave Sensors", Texas Instruments, May 2017, http://www.ti.com/lit/wp/spyy005/spyy005.pdf, pp. 1-9.
"Altran and NI Demonstrate Adas HIL With Sensor Fusion", National Instruments, Mar. 5, 2019, http://www.ni.com/en-us/innovations/white-papers/17/altran-and-ni-demonstrate-adas-hil-with-sensor-fusion.html, pp. 1-10.
(Continued)

*Primary Examiner* — Bernarr E Gregory
*Assistant Examiner* — Yonghong Li (57) ABSTRACT

A method and system are provided for generating a trigger signal from a radar signal received over the air from a radar under test. The method includes detecting power of the radar signal received from the radar under test at a radio frequency (RF) power detector, the radar signal including multiple bursts of RF energy in a burst pattern; identifying repeating radar frames from the burst pattern using the detected power of the radar signal, each radar frame having at least one burst; and creating trigger signals corresponding to the radar frames, respectively, by synchronizing to the at least one burst in each radar frame.

20 Claims, 6 Drawing Sheets

(56) References Cited

OTHER PUBLICATIONS

"dSPACE Automotive Radar Test Systems (DARTS)", dSPACE GmbH, 2019, https://www.dspace.com/en/inc/home/products/systems/darts.cfm, pp. 1-8.

Roland Liebske, "Short Description—ARS 404-21 (Entry) + ARS 408-21 (Premium) Long Range Radar Sensor 77 GHz", Continental Industrial Sensors, Oct. 19, 2016, Version : 1.03 en, pp. 1-50.

"Radar Environment/Target Simulator", Kratos RT Logic, https://www.kratosdefense.com/-/media/datasheets/radar-target-simulator.pdf, 2 pgs.

\* cited by examiner

METHOD AND SYSTEM FOR GENERATING TRIGGER SIGNALS FROM RADAR SIGNAL

BACKGROUND

Millimeter wave (mmWave) automotive radar is a key technology for advanced driver-assistance systems (ADAS) and for planned autonomous driving systems. Millimeter waves result from oscillations at frequencies in the frequency spectrum between 30 gigahertz (GHz) and 300 GHz. For example, millimeter wave automotive radar is used in ADAS to warn of forward collisions and backward collisions, to implement adaptive cruise control and autonomous parking, and ultimately to perform autonomous driving on streets and highways. Millimeter wave automotive radar has advantages over other sensor systems in that millimeter wave automotive radar can work under most types of weather and in light and darkness. The continued improvement of millimeter wave automotive radar has lowered costs to the point that mmWave automotive radar can now be deployed in large volumes. Thus, mmWave automotive radar is now widely used for long range, middle range and short range environment sensing in ADAS. Additionally, millimeter wave automotive radar systems are likely to be widely used in autonomous driving systems currently being developed.

Conventional automotive mmWave radar systems typically have multiple radio frequency (RF) transmitters and multiple RF receivers, where the RF transmitters may be used either to improve spatial resolution of the radar or to achieve transmitter beam sweeping. Actual driving environments in which automotive radars may be deployed can vary greatly and many such driving environments may be complex. For example, actual driving environments may contain numerous objects, and some objects encountered in actual driving environments have complicated reflection, diffraction and multi-time reflection characteristics that affect echo signals. The immediate consequences of incorrectly sensing and/or interpreting echo signals may be that false warnings, or improper reactions are triggered or warnings or reactions that should be triggered are not, which in turn can lead to collisions. Due to the safety critical nature of these functions, thorough testing of the hardware and system level software is necessary. It is impractical to set up road tests to thoroughly test these features, and especially the corner cases, which might happen rarely, but would nonetheless put the car into making life-or-death decisions.

To avoid accidents, automotive radars may be tested in various driving scenarios. A testing environment for automotive radars may include a radar test system (scenario emulator) that receives radar signals transmitted over the air (OTA) by the radar under test and provides echo signals from emulated targets. This enables simulation of a wide variety of driving scenarios for testing the radar without the need for safety drivers or permission from local governments, and without putting the drivers and the public at risk.

In general, automotive radars operate using the frequency-modulated continuous wave (FMCW) and multiple-input multiple-output (MIMO) methods. Typically, multiple transmit antennas send out a frequency modulated RF signal that reflects off objects (targets) in the environment. The reflected RF signal (echo signal) is subsequently received by multiple receive antennas. The time of flight of the RF signal is translated into a frequency difference due to the (typically linear) frequency modulation of the FMCW receiver. Phase differences between the echo signals received by the different receive antennas may be mathematically mapped to an angle of arrival (AOA).

Conventional radar test systems are typically "hardware-in-the-loop" systems, where the radar emulation is performed with real-time delays of the radar signal. These types of test systems provide limited angle resolution and are quite expensive per radar object emulated (e.g., about $100,000 per emulated target). For radar test systems that provide a true-time delay, external triggering is not needed to synchronize the delay with the radar frame. Also, in radar test systems that work on the principle of single side band (SSB) mixing to emulate a time delay, when there is only one chirp slope (rate of frequency change with time) per radar frame, triggering may not be needed. However, many modern automotive radars include radar frames having more than one chirp slope per frame. To emulate targets using SSB mixing for these radars, in-phase quadrature (I/Q) mixers in the receivers receive I/Q signals with different frequencies that must be synchronized with the parts of the radar frames corresponding to the different chirp slopes. Also, the radar test system typically runs at a different rate than the radar under test. Therefore, the radar test system must be synchronized with the radar under test to provide proper time alignment. This is currently done using external triggers, for example. However, use of external triggers is problematic because the radar under test operates autonomously, in that it does not use or provide electrical signals to synchronize with the radar test system. The radar test system needs to be synchronized to the radar under test, but the radar under test is not synchronized with any external signal.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, trigger signals indicating radar frames within a radar signal are created using distinctive characteristics of the radar signal itself. Creating the trigger signals may include outputting voltages from an RF power detector that are proportional to detected RF power of the radar signal. The output voltages may be amplified and compared with a reference voltage to provide a voltage waveform including pulses corresponding to RF energy bursts of the radar signal. The trigger signals may then be created using a logic circuit based on the timing of the rising and falling edges of the voltage waveform pulses. Alternatively, timestamps may be generated corresponding to the rising and falling edges of the voltage waveform pulses are generated. The rising and falling edge timestamps may be used to drive a finite state machine, which generates the trigger signals.

Figure 1:
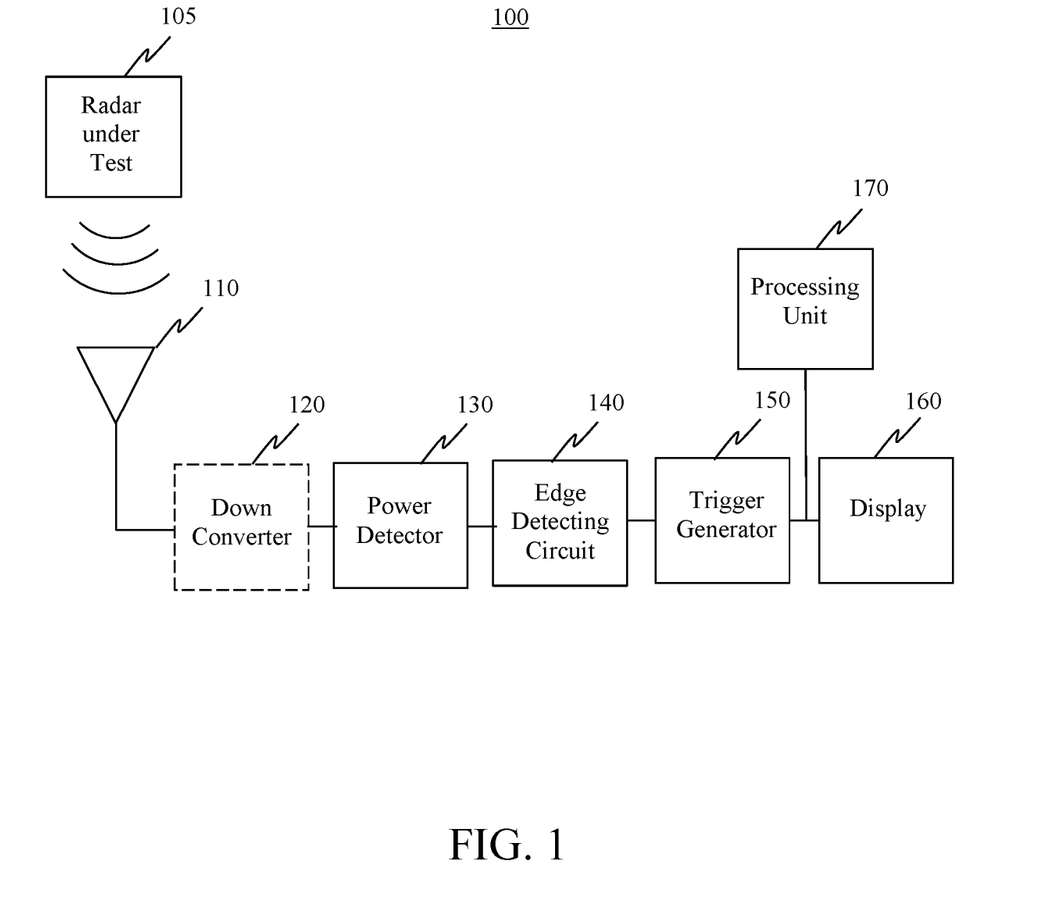
FIG. 1 is a simplified block diagram showing a system for generating a trigger signal from a radar signal used for radar testing, according to a representative embodiment.

FIG. 1 is a simplified block diagram showing a system 100 for generating a trigger signal from a radar signal used for vehicular radar testing, according to a representative embodiment. As will be appreciated by one of ordinary skill in the art having the benefit of the present disclosure, one likely vehicular radar is an automobile radar that is used in various capacities in current and emerging automobile applications. However, it is emphasized that the presently described system 100 for testing vehicular radar is not limited to automobile radar systems, and can be applied to other types of vehicles including busses, motorcycles, motorized bicycles (e.g., scooters), and other vehicles that could employ a vehicular radar system.

Figure 2:
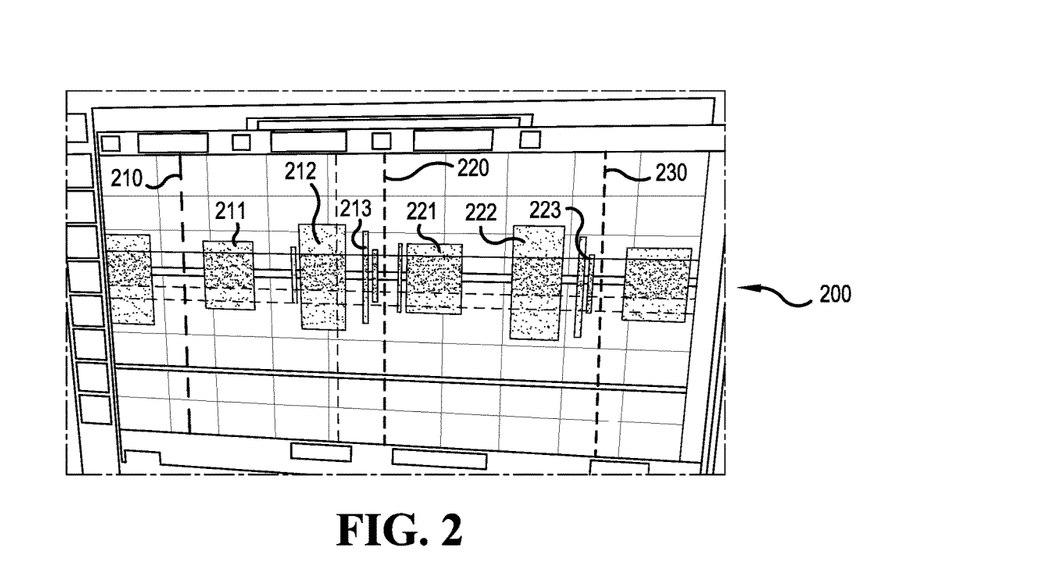
FIG. 2 shows a screen shot of an illustrative radar signal having a burst pattern with two bursts per radar frame, according to a representative embodiment.

Referring to FIG. 1, the system 100 is configured to receive a radar signal (RF signal) from a radar under test 105. The radar signal emitted by the radar under test 105 may be any of various types of radar signals, including a frequency-modulated continuous wave (FMCW) radar signal, a pulse-modulated continuous wave (PMCW) radar signal, or a pulsed radar signal, for example. The radar signal has a burst pattern including repeating bursts of RF energy that are arranged in repeating radar frames. Each radar frame includes one or more bursts of RF energy, depending on the type of radar signal and the burst pattern. An example of a radar signal with a repeating burst pattern is shown in FIG. 2, discussed below. The RF burst patterns are intended to reflect from targets, providing echo signals that return to the radar under test 105 for determining distance and location of the targets. Of course, using a radar test system (scenario emulator), the targets are emulated and the echo signals are generated by the radar test system in response to the RF energy bursts of the radar signal. Each RF energy burst has a corresponding chirp slope (rate of frequency change with respect to time). When each radar frame has multiple bursts, the chirp slopes of the multiple bursts may be the same as or different from one another, again depending on the type of radar signal.

The system 100 includes an antenna 110 that receives the radar signal over the air (OTA) from the radar under test 105, and an RF power detector 130 that detects a power level of the received radar signal. The antenna 110 may include one or more horn antennas or probe antennas, for example, which may be arranged inside a test range with the radar under test 105. The RF power detector 130 is configured to monitor and/or sample the received radar signal, and to output a DC voltage proportional to the power of the received radar signal. The RF power detector 130 may be a root mean squared (RMS) detector, a logarithmic detector or a peak/envelope detector, and may be implemented using an RF power diode, for example, although other types of RF power detectors may be incorporated without departing from the scope of the present teachings.

The system 100 optionally includes a downconverter 120 configured to downconvert a frequency of the radar signal to a downconverted frequency, also referred to as an intermediate frequency (IF). For example, the downconverter 120 may include a local oscillator (LO) and a mixer, where the LO generates an LO signal at an LO frequency and the mixer mixes the LO signal with the received radar signal to output a downconverted signal at the downconverted frequency. Alternatively, the downconverter 120 may be a sampling circuit that includes a Schottky diode configured to extract the power envelope of the RF signal (as in an AM demodulator). Accordingly, the RF power detector 130 operates at the RF frequency of the radar signal or at the downconverted RF frequency, depending one whether the optional downconverter 120 is present.

Notably, the radar signal at the emitted frequency or at the downconverted frequency may also be provided to a radar test system configured to provide echo signals from emulated targets for testing the radar under test, as mentioned above. An example of a radar test system comprising re-illuminators with re-illumination antennas and corresponding modulated reflection devices (MRDs) is discussed below with reference to FIGS. 7A and 7B.

The system 100 further includes an edge detecting circuit 140 and a trigger generator 150. The voltage output by the RF power detector 130 indicating the power of the radar signal is input to the edge detecting circuit 140, which is configured to detect edges of the bursts of RF energy in the radar signal, respectively, and to provide a voltage waveform having pulses corresponding to the RF energy bursts. That is, each RF energy burst in the radar signal is represented by a pulse of high level voltage extending for a period of time corresponding to the length of the RF energy burst. As mentioned above, each of the radar frames in the radar signal includes one or more of the RF energy bursts, depending on the type of radar signal. In an embodiment, the edge detecting circuit 140 may include an amplifier for amplifying the DC voltage output by the RF power detector 130, and a comparator for comparing the amplified voltage to a reference voltage, as discussed below with reference to FIGS. 4A and 4B. The comparator outputs a voltage waveform comprising pulses with corresponding rising and falling edges corresponding to the bursts of RF energy.

The trigger generator 150 receives the voltage waveform from the edge detecting circuit 140, and automatically generates the trigger signals indicating the corresponding radar frames in the radar signal. Generating the trigger signals based on the voltage waveform eliminates the need for external triggers, for example. In various embodiments, the trigger signals may coincide with the beginning of the respective radar frames, or they may be displaced by a predetermined time delay from the beginning of the respective radar frames. In various embodiments, the trigger generator 150 may be implemented as an analog circuit or a digital circuit. For example, as an analog circuit, the trigger generator 150 may delay rising and falling edges of the voltage waveform pulses, and create trigger signals using a logic circuit based on the timing of the rising and falling edges. In this manner, at least some of the voltage waveform pulses are effectively converted into the trigger signals that appear at a predetermined time following the beginning of a radar frame. Alternatively, as a digital circuit, the trigger generator 150 may generate rising and falling edge timestamps corresponding to the rising and falling edges of the voltage waveform pulses, respectively, and drive a finite state machine with the rising and falling edge timestamps to generate the trigger signals. That is, each of the rising and falling edge timestamps may advance the finite state machine until the trigger generator 150 outputs a trigger signal of predetermined length in response to entering the corresponding trigger generation state. The analog and digital implementations of the trigger generator 150 are discussed in more detail below, with reference to FIGS. 4A and 4B.

In the depicted embodiment, the trigger signals are output by the trigger generator 150 to a display 160, which may be configured to display various types of information acquired in the course of generating the trigger signals. For example, the display 160 may display amplitude of the radar signal as a function of time, thereby showing the actual bursts of RF energy. The display 160 may display the voltage waveform output by the edge detecting circuit 140 as pulses between low and high voltage levels over time, where the pulses correspond to the bursts of RF energy. The display 160 may also display the trigger signals output by the trigger generator 150 as short pulses, each of which indicates a corresponding radar frame. In various embodiments, the trigger signals may be displayed together with the actual bursts of RF energy and/or the pulsed waveform in order to show the relative timing of the trigger signals and the start of the corresponding frames.

In addition, the trigger signals output by the trigger generator 150 may be provided to a processing unit 170 of a radar test system that generates echo signals from emulated targets, as discussed below. For example, the trigger signals may be used to identify when the chirp slope changes within a radar frame having multiple RF energy bursts. Also, the trigger signal may be used to change the behavior of the radar test system adaptively within a radar frame, based on the characteristics of the radar burst that is active at that moment. For example, if the radar test system is emulating a target at a specific distance, it provides a different IF offset frequency for the long-range radar chirps than for the medium range radar chirps, since these have different FMCW frequency slopes. Accordingly, the target distance is emulated consistently using both long and medium range bursts, so that the emulated target is not filtered out by the radar.

FIG. 2 shows a screen shot of an illustrative radar signal having a burst pattern with two bursts per radar frame, according to a representative embodiment. Referring to FIG. 2, a radar signal 200 is an example of an FMCW radar signal that may be received at the antenna 110, the optional downconverter 120 and the RF power detector 130. Of course, other types of radar signals with various burst patterns may be incorporated without departing from the scope of the present teachings.

The radar signal 200 has three representative radar frames indicated by dashed lines, including a first radar frame 210, a second radar frame 220 and a third (partially shown) radar frame 230. In the depicted example, each of the radar frames includes two bursts of RF energy and a doublet. A doublet is a pair of RF energy bursts having negligible time separation in between and may be used for some special purpose as determined by the radar developers. In the depicted example, the doublet is a stepped continuous wave (CW) signal, which may be used for providing coarse Doppler resolution, for example, in combination with chirp-to-chirp Doppler measurements, which have fine resolution but have multiple solutions separated by a coarse velocity. For example, the fine resolution measurements may indicate velocities of objects to be 12 mph, 57 mph and 93 mph, and the stepped CW signals help resolve that a particular object is in a particular velocity bucket (e.g., 12 mph). Each radar has its own power signature, which can be used to synchronize the test system to what the radar is doing.

In the depicted example, the first radar frame 210 includes a first burst 211, a second burst 212 and a doublet 213, and the second radar frame 220 includes a first burst 221, a second burst 222 and a doublet 223. The first bursts 211 and 221 may be long range bursts and the second bursts 212 and 222 may be medium range bursts, for example, where the long range bursts are intended to illuminate targets at greater distances than the medium range bursts. That is, the long range bursts may have a slow chirp that enables detection of long range targets, as the round trip time of flight of the radar signal (out and back) is such that when the corresponding echo is received, the radar is still on the same chirp of the emitted radar signal. Also, the long range bursts may use a different antenna configuration than the medium range bursts. The long range antenna configuration focuses the energy more than the medium range antenna configuration, so there is still signal returning from an object that is 100 m away, for example. To focus the energy, the long range antenna configuration compromises a bit on range resolution, so the medium range antenna configuration (broader antenna pattern and faster chirp slope) can be used for better accuracy (range and angle) at the closer ranges, although the radar signal will not travel as far, as the same energy is spread over a larger area. Also, generally, long range bursts have smaller chirp slopes than the medium range bursts, as would be apparent to one of ordinary skill in the art.

Figure 3:
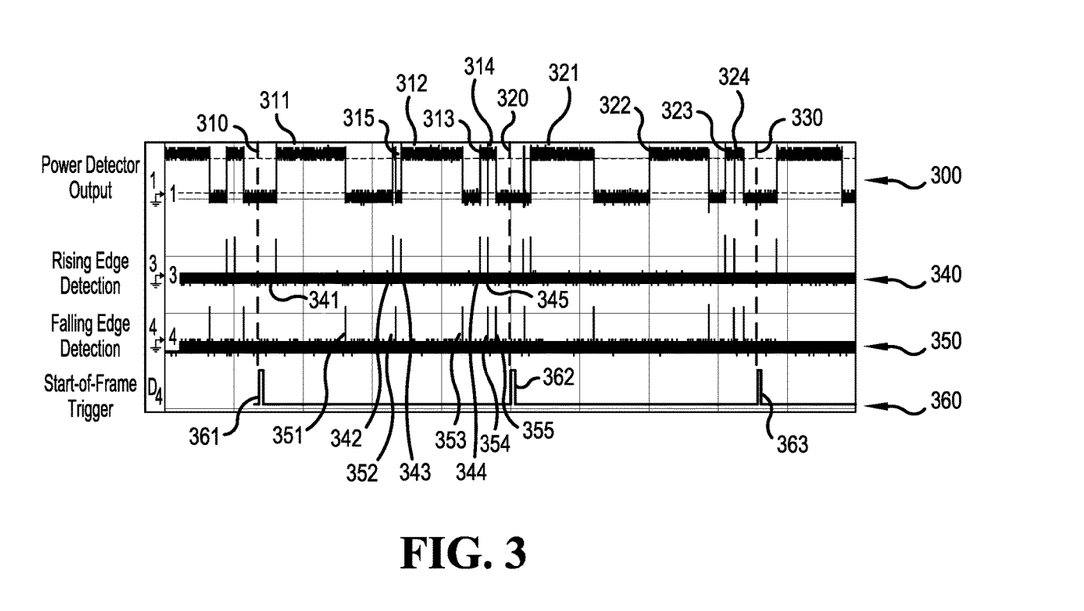
FIG. 3 shows a screen shot of a voltage waveform and trigger signals corresponding to an illustrative radar signal having a burst pattern with two bursts per radar frame, according to a representative embodiment.

FIG. 3 shows a screen shot of a voltage waveform and trigger signals corresponding to an illustrative radar signal having a burst pattern with two bursts per radar frame, according to a representative embodiment. Referring to FIG. 3, an illustrative voltage waveform 300 is output by the RF power detector 130 in response to the illustrative radar signal 200 shown in FIG. 2, and an illustrative trigger signal waveform 360 is output by the trigger generator 150 in response to the voltage waveform 300. FIG. 3 also includes a rising edge detection waveform 340 and a falling edge detection waveform 350 that also may be output by the edge detecting circuit 140 for determining the timing of the trigger signal waveform 360.

To obtain the rising edge detection waveform 340, the edge detecting circuit 140 would include a logic circuit that creates a short pulse in response to each rising edge of the voltage waveform 300. For example, the logic circuit may include an AND gate, and an inverter and delay element connected to one of the two inputs of the AND gate, such that the AND gate receives the voltage waveform 300 at one input and an inverted, delayed voltage waveform 300 at the other input, and outputs short pulses (with pulse widths determined by the delay element) corresponding to each rising edge. To obtain the falling edge detection waveform 350, the edge detecting circuit 140 would include a logic circuit that creates a short pulse in response to each falling edge of the voltage waveform 300. For example, the logic circuit may include a NOR gate, and an inverter and delay element connected to one of the two inputs of the NOR gate, such that the NOR gate receives the voltage waveform 300 at one input and an inverted, delayed voltage waveform 300 at the other input, and outputs short pulses (with pulse widths determined by the delay element) corresponding to each falling edge. Alternatively, the logic circuit for detecting the falling edges may include a first inverter that inverts the voltage waveform 300, an AND gate, and a second inverter and delay element connected to one of the inputs of the AND gate. Of course, other configurations of the rising and falling edge detection logic may be implemented without departing from the scope of the present teachings.

Like the radar signal 200, the corresponding voltage waveform 300 in FIG. 3 has three representative radar frames indicated by dashed lines, including a first radar frame 310 corresponding to the first radar frame 210, a second radar frame 320 corresponding to the second radar frame 220 and a third (partially shown) radar frame 330 corresponding to the third (partially shown) radar frame 230. In the depicted example, each of the radar frames includes two pulses corresponding to bursts of RF energy and a pair of doublet pulses corresponding to the doublet. For example, the first radar frame 310 includes a first burst pulse 311, a second burst pulse 312, a first doublet pulse 313 and a second doublet pulse 314, and the second radar frame 320 includes a first burst pulse 321, a second burst pulse 322, a first doublet pulse 323 and a second doublet pulse 324. In addition, the first radar frame 310 also includes a representative spurious pulse 315, which may be caused by noise, for example. The spurious pulse 315 is ignored in order to provide properly aligned trigger signals. For example, the spurious pulse 315 may be detected by the edge detecting circuit 140, but identified as being spurious based on the position of the spurious pulse 315 in relation to the expected first burst pulse 311, second burst pulse 312, first doublet pulse 313 and second doublet pulse 314, or based on its short pulse width.

The rising edge detection waveform 340 includes short pulses corresponding to every rising edge of the voltage waveform 300, and the falling edge detection waveform 350 includes short pulses corresponding to every falling edge of the voltage waveform 300. For example, referring to the first radar frame 310, the rising edge detection waveform 340 includes pulse 341 corresponding to the rising edge of the first burst pulse 311, pulse 345 corresponding to the rising edge of the spurious pulse 315, pulse 342 corresponding to the rising edge of the second burst pulse 312, pulse 343 corresponding to the rising edge of the first doublet pulse 313, and pulse 344 corresponding to the rising edge of the second doublet pulse 314. Likewise, for example, the falling edge detection waveform 350 includes pulse 351 corresponding to the falling edge of the first burst pulse 311, pulse 355 corresponding to the falling edge of the spurious pulse 315, pulse 352 corresponding to the falling edge of the second burst pulse 312, pulse 353 corresponding to the falling edge of the first doublet pulse 313, and pulse 354 corresponding to the falling edge of the second doublet pulse 314.

The trigger signal waveform 360 includes trigger pulses that indicate the radar frames. For example, the trigger signal waveform 360 includes trigger pulse 361 marking the beginning of the first radar frame 310, trigger pulse 362 marking the beginning of the second radar frame 320, and trigger pulse 363 marking the beginning of the third radar frame 330. In the depicted example, the trigger pulses are provided at a predetermined time delay (e.g., 5 ms) following the falling edges of the second doublet pulses. So, for example, the trigger pulse 362 marking the beginning of the third radar frame 330 occurs at the predetermined time delay after the falling edge pulse 354 in the second radar frame 320. Knowing the predetermined time delay, the frame structure (e.g., relative timing of the different parts of the radar frame, such as long and medium range bursts) and the chirp slopes, trigger signals can be generated that indicate when particular parts of the radar frame occur. Then, the radar test system behaviors can be changed or otherwise controlled at those times to provide consistent scene emulation to the radar under test. Alternatively, the trigger pulse may occur immediately following the falling edge pulse (no time delay), or the trigger pulse may occur at a predetermined time delay or immediately following the rising edge pulse associated with the second doublet pulse, without departing from the scope of the present teachings. Likewise, the trigger pulse may occur at a predetermined time delay or immediately following any other pulses repetitively appearing in the radar frames of the voltage waveform 300 that are indicative of the frames, without departing from the scope of the present teachings.

All or part of the trigger generator 150 may be implemented by a processing unit, such as the processing unit 170, for example. The processing unit may include one or more computer processors, digital signal processors (DSP), field-programmable gate arrays (FPGAs), application specific integrated circuits (ASICs), or combinations thereof, using any combination of hardware, software, firmware, hard-wired logic circuits, or combinations thereof. The processing unit may include its own processing memory for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIG. 5. That is, execution of the instructions/computer readable code generally causes the processing unit to identify the beginning of the radar frames and to cause the trigger signals to be generated at a predetermined time following the beginning of the radar frames, as discussed below. The processing memory and any other memory (and databases) described herein may be various types of random access memory (RAM) and/or read only memory (ROM), including flash memory, electrically programmable read-only memory (EPROM), electrically erasable and programmable read only memory (EEPROM), compact disk read only memory (CD-ROM), digital versatile disk (DVD), registers, a hard disk, a removable disk, tape, floppy disk, blu-ray disk, or universal serial bus (USB) driver, or any other form of storage medium known in the art, which are tangible and non-transitory computer readable storage media (e.g., as compared to transitory propagating signals). Memories may be volatile or non-volatile, secure and/or encrypted, unsecure and/or unencrypted, without departing from the scope of the present teachings.

Figure 4A:
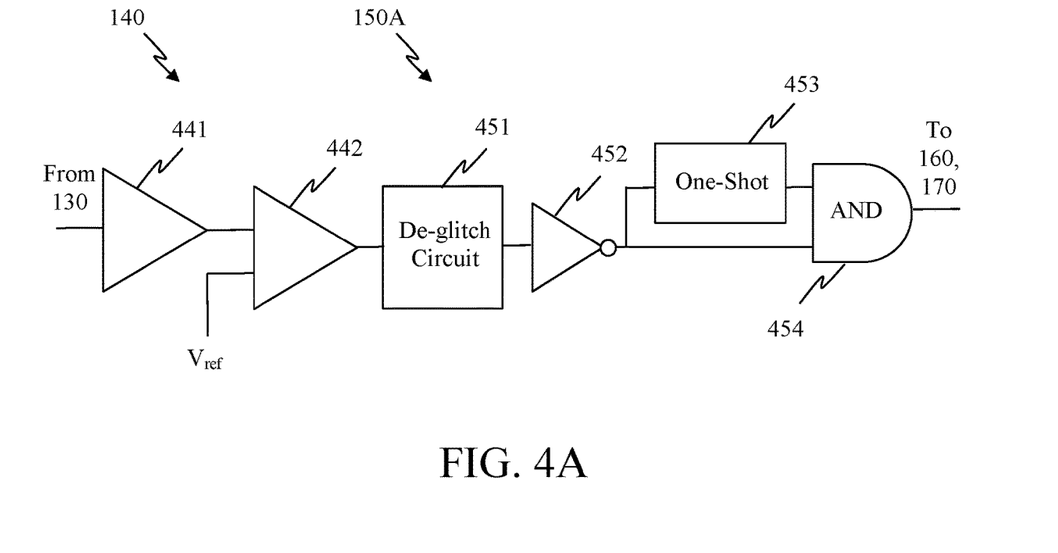
FIG. 4A is a simplified block diagram showing an implementation of an edge detecting circuit and an analog trigger generator, according to a representative embodiment.
Figure 4B:
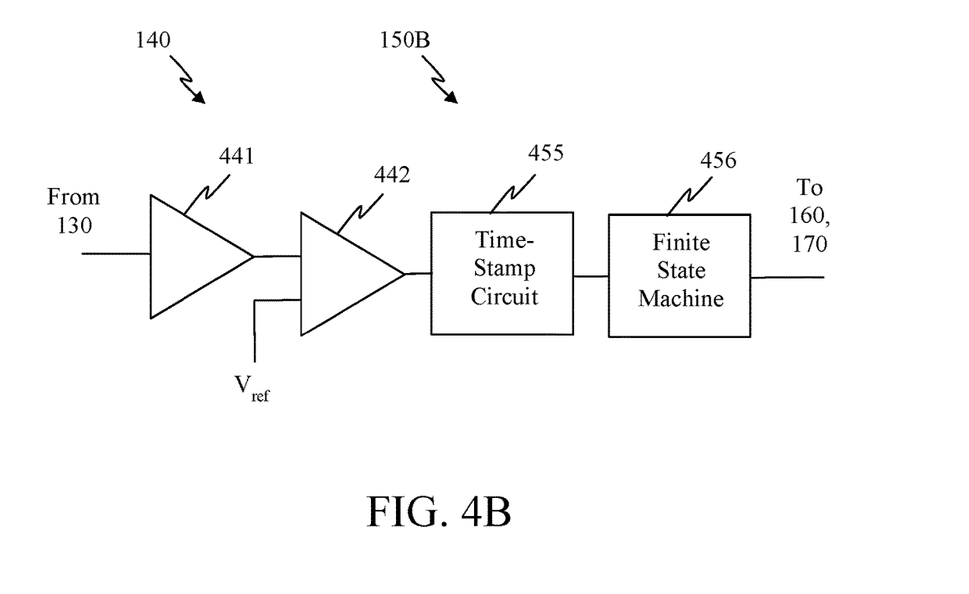
FIG. 4B is a simplified block diagram showing an implementation of an edge detecting circuit and a digital trigger generator, according to a representative embodiment.

FIG. 4A is a simplified block diagram showing an implementation of an edge detecting circuit and an analog trigger generator, and FIG. 4B is a simplified block diagram showing an implementation of an edge detecting circuit and a digital trigger generator, according to representative embodiments. Of course, the edge detecting circuit and/or the trigger generator may be implemented using different components, without departing from the scope of the present teachings.

Referring to FIG. 4A, the illustrative edge detecting circuit 140 includes a high speed amplifier 441 and a high speed comparator 442. The amplifier 441 amplifies the DC voltage output by the RF power detector 130, and the comparator 442 receives the amplified voltage and compares it to a reference voltage $V_{ref}$. When the amplified voltage exceeds the reference voltage $V_{ref}$, the comparator 442 outputs a high level voltage (1), and when the amplified voltage does not exceed the reference voltage $V_{ref}$, the comparator 442 outputs a low level voltage (0), thereby generating a voltage waveform having pulses corresponding to the bursts of RF energy, respectively. Each of the pulses of the voltage waveform has corresponding rising and falling edges, which may be detected separately, as discussed above with reference to FIG. 3.

The illustrative analog trigger generator 150A is an analog trigger generator in that it outputs trigger pulses that are derived from the pulses in the voltage waveform. The analog trigger generator 150A includes a de-glitch circuit 451 configured to remove unnecessary or spurious signal transitions from the voltage waveform output of the comparator 442, and an inverter 452 configured to invert the de-glitched voltage waveform. De-glitch circuits are well known, and can be constructed of simple logic gates and small delay circuits, as would be apparent to one of ordinary skill in the art. The analog trigger generator 150A further includes a one-shot pulse generator 453 and an AND logic gate 454. The one-shot 453 is configured to output a single pulse with a short pulse width (e.g., less than about 1 msec) in response to the inverted output from the inverter 452. For example, the one-shot 453 may output the single pulse in response to a falling edge of a pulse in the voltage wave output by the de-glitch circuit 451. The one-shot pulse generator 453 may include an IC timing chip, such as the well-known bipolar 555 timer or any of the modern CMOS equivalent chips, together with external RC feedback to set the desired timing delay. A fixed capacitance and a potentiometer variable resistance, for example, may be included for adjustable timing delay to adjust the duration of the one-shot pulse generator 453. The AND logic gate 454 is configured receive the inverted output from the inverter 452 and the single pulse output by the one-shot 453, and to output a trigger pulse as the trigger signal. Because of the AND logic, the trigger pulse corresponds in pulse width to that of the single pulse output by the one-shot 453. Accordingly, for the illustrative edge detecting circuit 140, the output of the AND logic gate 454 is only high when both inputs are high. When the de-glitch circuit 451 outputs a low pulse, the inverter 452 changes the polarity of the pulse to make the following circuit work properly. The AND logic gate 454 may also clean up transition edges from the de-glitch circuit 451, making them less noisy.

Referring to FIG. 4B, the illustrative edge detecting circuit 140 includes the high speed amplifier 441 and the high speed comparator 442 for generating the pulsed voltage waveform, as discussed above. The illustrative digital trigger generator 150B is a digital trigger generator in that it separately generates trigger pulses in response to specifically detected features of the voltage waveform. The digital trigger generator 150B includes a timestamp circuit 455 and a finite state machine 456. The timestamp circuit 455 is configured to generate timestamps corresponding to the rising and falling edges of the voltage waveform pulses, respectively.

The finite state machine 456 transitions through the predetermined states that reflect a logic pattern, according to which the trigger signals are generated. Since the finite state machine 456 may be based on detection of specific occurrences in the voltage waveform, the digital trigger generator 150B provides more control over when to generate the trigger signals. For example, the finite state machine 456 may generate trigger signals in response to multiple events, such as multiple pulses in the voltage waveform. Also, the finite state machine 456 may implement time delays following the occurrence of one or more detect events before the trigger signal is generated. An example of a finite state machine is discussed below with reference to FIG. 6. The finite state machine 456 may be implemented by a processing unit, such as the processing unit 170, for example.

Figure 5:
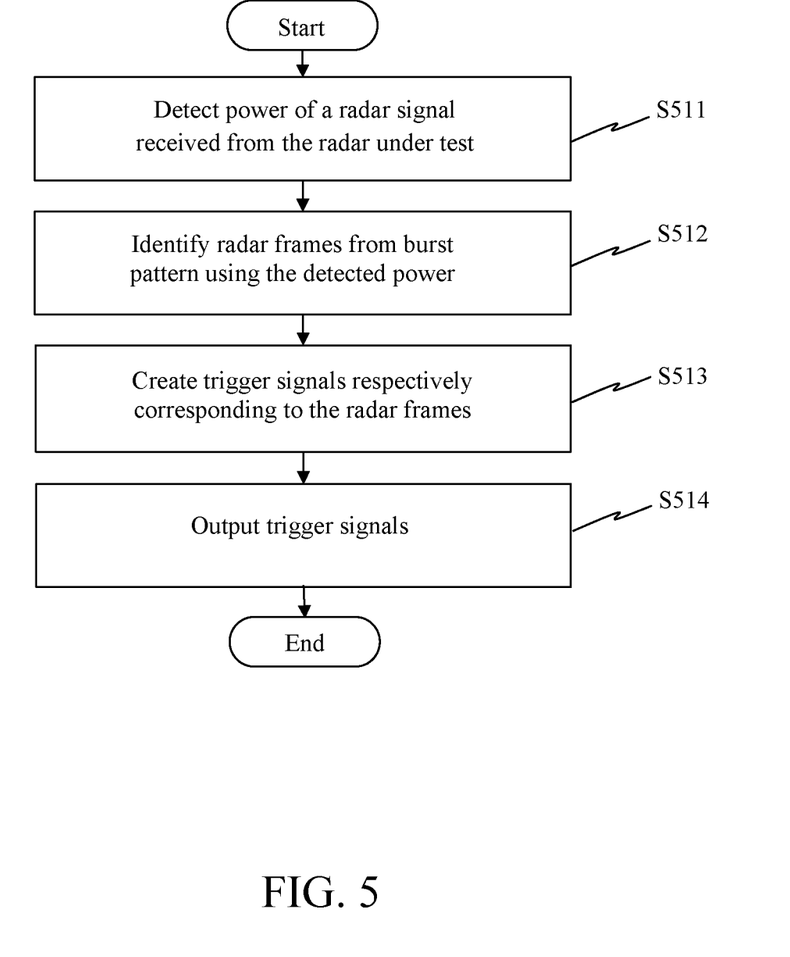
FIG. 5 is a simplified flow diagram illustrating a method for generating a trigger signal from a radar signal received over the air from a radar under test, according to a representative embodiment.

FIG. 5 is a simplified flow diagram illustrating a method for generating a trigger signal from a radar signal received over the air from a radar under test, according to a representative embodiment. The method may be implemented on the system 100, discussed above, for example.

Referring to FIG. 5, power of a radar signal received from the radar under test is detected in block S511 at an RF power detector. The radar signal has a burst pattern of RF energy, and includes repeating radar frames with one or more bursts of RF energy within each radar frame according to the burst pattern. That is, each radar frame may have one RF energy burst, or multiple RF energy bursts, depending on the type of radar signal and the burst pattern. The RF energy bursts are intended to reflect from targets to provide echo signals for determining distance and location of the targets. Each RF energy burst has a corresponding chirp slope. When each radar frame has multiple RF energy bursts, the chirp slopes of the multiple bursts may be the same as or different from one another, again depending on the type of radar signal. Each radar frame may also include one or more doublets, as discussed above, which may be short frequency stepped CW tones, for example, and not chirps. Detecting the power of the radar signal may include converting amplitude of the radar signal to corresponding DC voltages, as discussed above.

The radar signal is emitted by the radar under test, and collected by one or more antennas of the test system. The power of the radar signal may be detected by an RF power detector at its RF frequency, or it may first be down-converted to a lower frequency before detection, as discussed above. For example, the radar signal may be down converted to a lower frequency using a sampling circuit including a Schottky diode, or using an LO circuit including an LO that generates an LO signal and a mixer that mixes the LO signal with the received radar signal to output an intermediate frequency (IF) signal. When down converting, the power detection is performed on the IF signal.

In block S512, the radar frames are identified from the burst pattern using the detected power of the radar signal. The radar frames may be identified using an analog circuit that provides characteristic edges corresponding to the bursts of RF energy in the radar frames. For example, the detected power of the RF energy bursts in the radar signal may be converted into a voltage waveform that includes a repeating series of pulses corresponding to the RF energy bursts. That is, each RF energy burst in the radar signal is represented by a pulse of high level voltage extending for the period of time as the RF energy burst, and then returning to a low level voltage.

Each pulse in the voltage waveform has a rising edge and a falling edge, where detection of either or both of the rising and falling edges may be used to identify the start of the radar frame containing the RF energy burst, or the start of the next consecutive radar frame. The radar frames are identified using a characteristic of the radar signal or the voltage waveform. For example, the characteristic may be the rising or falling edge of one of the pulses corresponding to an RF energy burst. When there are multiple RF energy bursts per radar frame, each radar frame may be identified by counting the pulses corresponding to the RF energy bursts, and identifying the next radar frame after the number of pulses corresponding to the RF energy bursts has passed. Alternatively, the characteristic used to identify the start of each radar frame may be some other burst of RF energy, separate from the RF energy bursts used for providing echo signals, such as a doublet, discussed above. Such characteristics may be included in the radar signal for the purpose of accommodating RF frame identification.

In an embodiment, the DC voltage output by the RF power detector may be compared with a reference voltage to provide a high voltage level when the DC voltage exceeds the reference voltage and a low voltage level when the DC voltage does not exceed the reference voltage. This results in the voltage waveform with pulses corresponding to the RF energy bursts. The start of the radar frame may coincide with a rising edge or a falling edge of a particular pulse, or may start a predetermined time delay from a rising edge or a falling edge of a particular pulse. The identification of the radar frames repeats over the voltage waveform.

In block S513, trigger signals respectively corresponding to the radar frames are created by synchronizing to at least one RF energy burst in each of the identified radar frames. In various embodiments, the trigger signals may be created using an analog circuit or a digital circuit, as discussed above.

Using an analog circuit, the trigger signals may be created by receiving the voltage waveform used for detecting the radar frames, optionally delaying the rising and falling edges of the voltage waveform pulses, and creating the trigger signals using a logic circuit based on the timing of the rising and falling edges of the voltage waveform pulses. For example, the analog circuit may include a rising edge timer (e.g., a 555 timer integrated circuit (IC)) that receives the voltage waveform and outputs a rising edge pulse in response to the rising edge of a voltage pulse, and a falling edge timer (e.g., a 555 timer IC) that receives (an inverse of) the voltage waveform and outputs a falling edge pulse in response to the falling edge of the voltage pulse. The rising edge pulse may have a predetermined time delay following detection of the rising edge of the voltage pulse. The logic circuit may further include an AND logic gate that receives as input the delayed rising edge pulse and the falling edge pulse, and outputs an output pulse when the input rising and falling edge pulses are concurrent. The output pulse of the AND logic gate may be used as the trigger signal, or the output pulse may be delayed using another precision timer to delay the output pulse an arbitrary amount to deliver a trigger signal at a precise relative location within the frame. When the trigger signal is based off of a doublet, for example, the output (or delayed output) of the AND logic gate may be input to a de-glitch circuit, as discussed above, so that only one trigger signal is produced instead of two. .Of course, other configurations of analog circuits for creating trigger signals may be incorporated, without departing from the scope of the present teachings.

Using a digital circuit, the trigger signals may be created using a system clock, a digital counter connected to the system clock, and a finite state machine (e.g., implemented by software executed by the processing unit 170). The rising and falling edges of the voltage waveform may cause the digital counter to latch corresponding time values (timestamps), and to set a bit indicating whether each of the time values results from a rising or falling edge. The time values are input to the finite state machine, e.g., as rising and falling edge timestamps, which outputs the trigger signals according to the various states. For example, the finite state machine may set a trigger value, and compare the input rising and falling edge time values with the trigger value. When a rising and/or falling edge time value from the digital counter is the same as the trigger value, the finite state machine causes a hardware trigger signal to be output. The trigger signal may be a pulse for only one clock cycle, although a delay circuit may be included to lengthen the pulse of the trigger signal, as desired. Stated differently, the timestamps indicating occurrences of the rising and falling edges are input to the finite state machine, which transitions to the next state when corresponding criteria are satisfied. The final state triggers output of the trigger signal indicating a corresponding radar frame, and the finite state machine resets to its initial (idle) state. Of course, other configurations of digital circuits for creating trigger signals may be incorporated, without departing from the scope of the present teachings.

The above described analog and digital circuits are examples of how to create trigger signals from detected edges of the voltage waveform. Alternative designs of analog and digital circuits for creating the trigger signals would be well known. The circuits may vary, for example, depending on the burst patterns of the radar signals and desired time delays between trigger signals and rising and/or falling edge detections, in order to provide unique benefits for any particular situation or to meet application specific design requirements of various implementations, as would be apparent to one of ordinary skill in the art.

Figure 6:
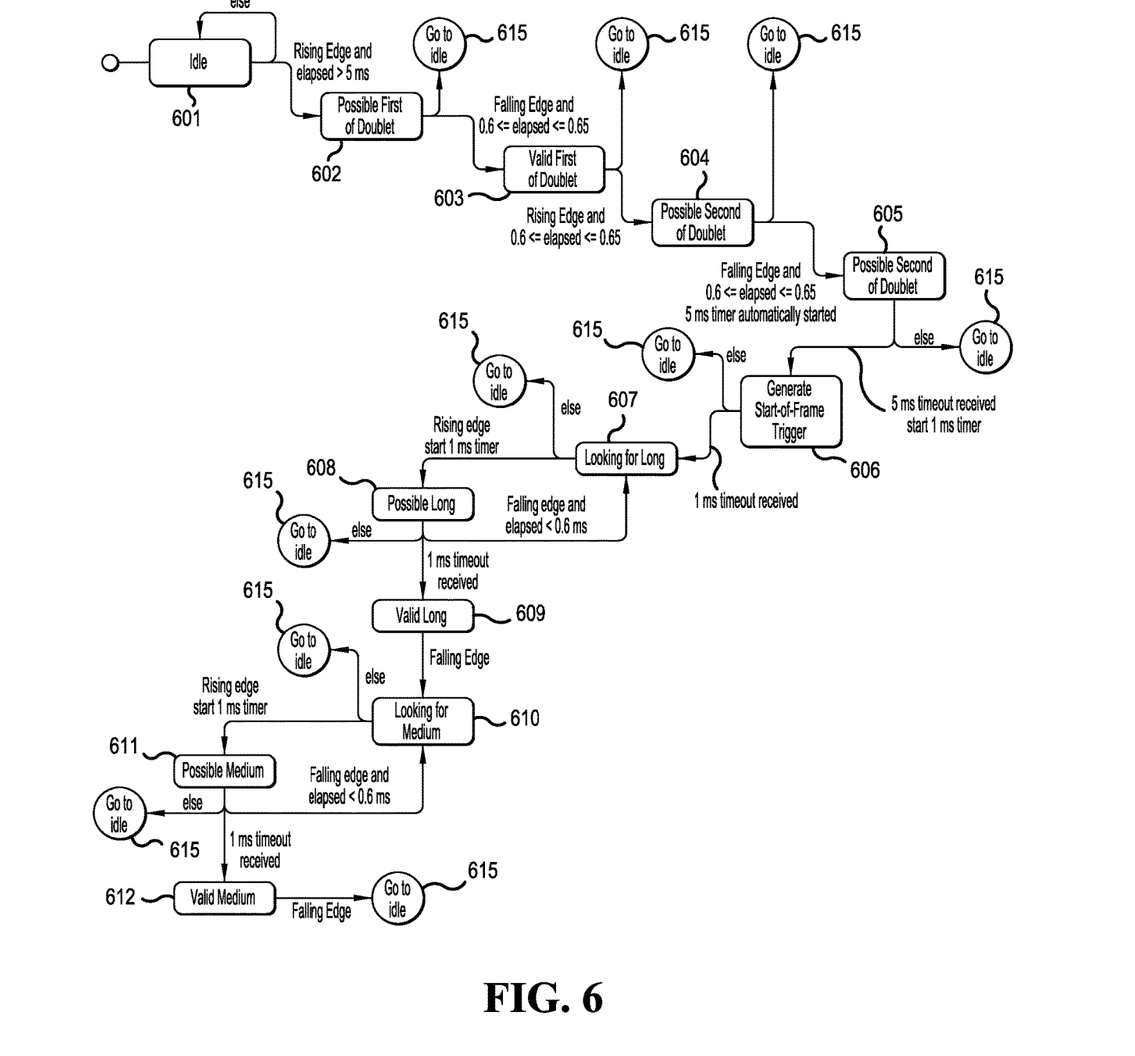
FIG. 6 is a simplified flow diagram showing an illustrative implementation of a finite state machine for generating a trigger signal from a radar signal, according to a representative embodiment.

FIG. 6 is a simplified flow diagram showing an illustrative implementation of a finite state machine for generating a trigger signal from a radar signal, according to a representative embodiment.

Referring to FIG. 6, an illustrative finite state machine 600 is booted in an idle state 601, and begins receiving timestamps corresponding to the rising and falling edges of the voltage waveform pulses. For purposes of illustration, it is assumed that the finite state machine 600 receives the voltage waveform 300 shown in FIG. 3, which is indicative of the radar signal 200 shown in FIG. 2. Each of the radar frames in the voltage waveform 300 includes a first pulse, a second burst pulse and a doublet with a first doublet pulse and a second double pulse. For example, representative first radar frame 310 includes the first burst pulse 311, the second burst pulse 312, the first doublet pulse 313 and the second doublet pulse 314. In the depicted example, the start of the next consecutive radar frame is identified using the doublet in the current radar frame, as the doublet is a distinctive feature. Other signal characteristics may be used to identify the radar frames in the voltage waveform 300 or in other types of waveforms, without departing from the scope of the present teachings. Incorporation of these other signal characteristics and/or the different types of waveforms (and corresponding radar signals) would involve different finite state machines, although the general implementation would be similar to that depicted in FIG. 6, as would be apparent to one of ordinary skill in the art.

In the idle state 601, for each received rising edge of the voltage waveform, it is determined whether a target time has elapsed (e.g., greater than 5 ms) since receiving the previous rising edge. When the elapsed time is less than the target time, the finite state machine 600 remains in the idle state 601 regardless of detected rising edges. When the elapsed time is greater than the target time, the finite state machine 600 transitions to state 602, identifying a detected rising edge as a possible first pulse of a doublet. The time between the rising edge and the next falling edge is determined, and compared to a pulse width time range (e.g., greater than 0.60 ms and less than 0.65 ms). When the determined time is within the pulse width time range, the finite state machine 600 transitions to state 603, identifying a valid first pulse of a doublet. Otherwise, the finite state machine 600 returns to the idle state 601 as indicated by return block 615. Notably, whenever criteria for a specific state are not satisfied, the finite state machine 600 defaults by returning to the idle state 601, as indicated by the return blocks 615 shown throughout FIG. 6.

The time between the falling edge and the next rising edge is then determined, and compared to a doublet spacing time range (e.g., greater than 0.60 msec. and less than 0.65 msec.), which may be the same as or different from the pulse width time range. When the determined time is within the doublet spacing time range, the finite state machine 600 transitions to state 604, identifying a possible second pulse of the doublet. The time between the rising edge and the next falling edge is then determined, and compared to the pulse width time range. When the determined time is within the pulse width time range, the finite state machine 600 transitions to state 605, identifying a valid second pulse of the doublet. In the depicted example, the doublet is at the end of a current radar frame, and is used to identify the beginning of a next radar frame for purposes of generating the trigger signal.

Once the second pulse of the doublet is verified, the finite state machine 600 automatically starts a delay timer that delays generation of the trigger signal by a predetermined time delay (e.g., 5 ms), which may be measured using a digital counter, for example. Once the time delay elapses, the finite state machine 600 transitions to state 606, causing generation of the trigger signal that identifies the next radar frame (following the doublet). The trigger signal may be generated, for example, using a hardware timer and latching transitions in response to a software interrupt.

The trigger signal is de-asserted after a timeout period (e.g., 1 ms), and the finite state machine 600 transitions to state 607, looking for the first burst (e.g., long range burst) in the next radar frame of the radar signal, indicated by the trigger signal asserted at state 606. When a rising edge is detected, a timer (e.g., 1 ms timer) is started and the finite state machine 600 transitions to state 608, indicating a possible first burst. When a falling edge is detected within a predetermined rejection period (e.g., less than 0.60 ms), the corresponding pulse is rejected as a runt pulse (e.g., such as spurious pulse 315 shown in FIG. 3), and the finite state machine 600 returns to state 607 to continue looking for the first burst. When no falling edge is detected before the timer times out, the finite state machine 600 transitions to state 609, identifying a valid first burst of the radar frame.

The finite state machine 600 transitions to state 610, looking for the second burst (e.g., medium range burst) in the radar frame of the radar signal. When a rising edge is detected, a timer (e.g., 1 ms timer) is started and the finite state machine 600 transitions to state 611, indicating a possible second burst. When a falling edge is detected within a predetermined rejection period (e.g., less than 0.60 ms), the corresponding pulse is rejected as a runt pulse, and the finite state machine 600 returns to state 610 to continue looking for the second burst. When no falling edge is detected before the timer times out, the finite state machine 600 transitions to state 612, identifying a valid second burst of the radar frame. The finite state machine 600 thus completes the set of computational states, and returns to the idle state 601, indicated by the return block 615. Back in the idle state 601, the finite state machine 600 again begins searching for a first pulse of the next doublet in order to identify the next consecutive radar frame and generate the corresponding trigger signal.

Referring again to FIG. 5, in block 5514, the trigger signals are output for display and/or processing by the processing unit of a radar test system. For example, the trigger signals may be used to identify when the chirp slope of the radar signal changes in each of the radar frames. This allows the processing unit to create a trigger signal to adjust the IF frequency of the radar test system to match the changes in the chirp slopes in each frame. However, not all the portions of the radar frame are entirely FMCW. For example, some radars have frames in which certain portions are pure CW. For these radars, the IF may be programmed to return the Doppler velocity during a portion of the radar frame indicated by the trigger signal, as no range is measured. That is, for FMCW, both a time delay due to signal travel and Doppler velocity cause frequency shifts in the resultant IF signal, so the velocity has to be measured separately to separate these components. For portions of the frames that are only CW signals, there is no range information, as the LO signal is the same when the signal leaves as when its echo returns. But, if the emulated target is moving relative to the radar under test, there is a measurable (small) frequency shift, which can be used to measure velocity or range of velocities.

Other types of radars may include inter-frame signals that are not FMCW, such as PMCW, in which case the triggers may indicate to the radar test system in what portion of the frame the radar is operating, so the radar test system is able to provide the appropriately formatted echo signals since different radar formats, such as FMCW versus the PMCW, need different types of echo signals sent to the radar under test.

Figure 7A:
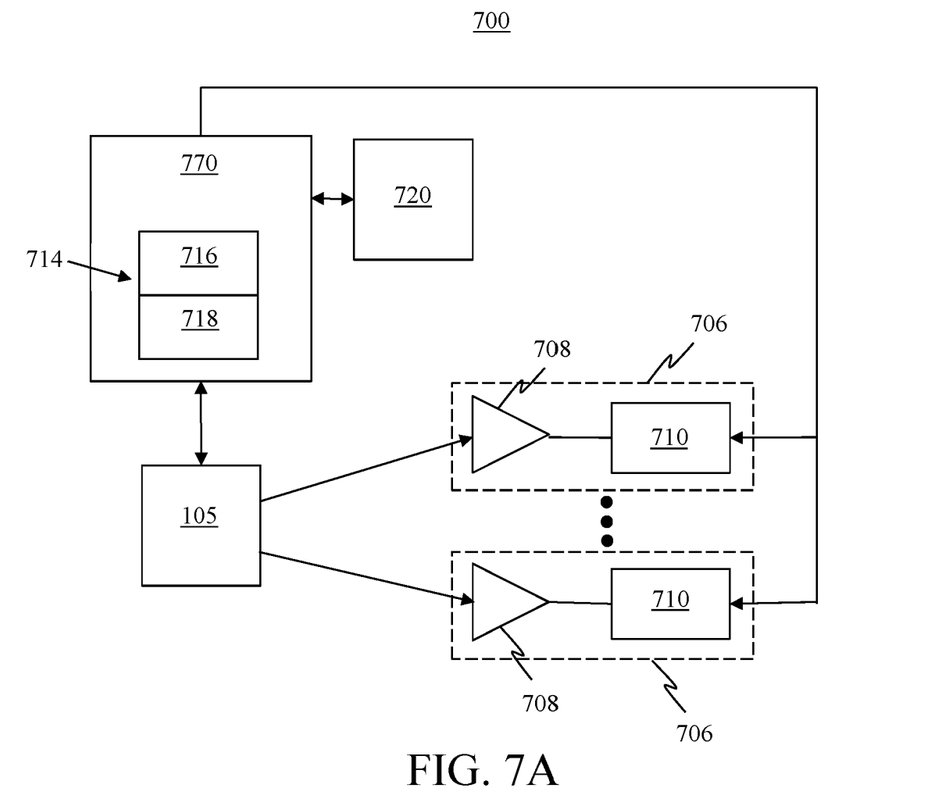
FIG. 7A is a simplified block diagram showing a radar test system for testing vehicular radar, according to a representative embodiment.
Figure 7B:
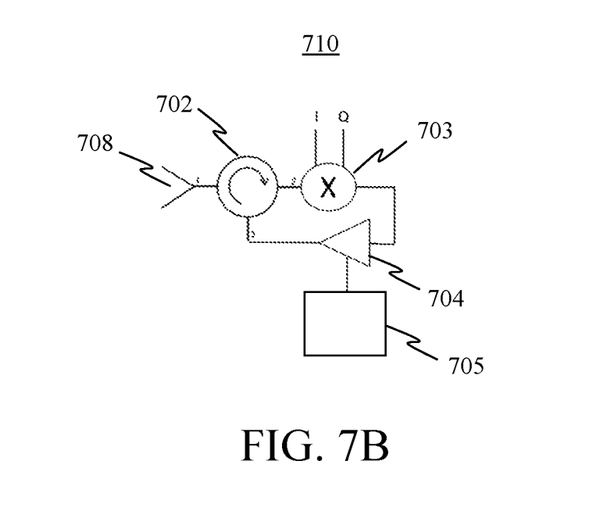
FIG. 7B is a simplified circuit diagram showing a modulated reflection device (MRD) in the radar test system for testing vehicular radar in FIG. 7A, according to a representative embodiment.

FIG. 7A is a simplified block diagram showing a radar test system for testing vehicular radar, according to a representative embodiment, and FIG. 7B is a simplified circuit diagram of a modulated reflection device (MRD) in the radar test system of FIG. 7A, according to a representative embodiment. The trigger signals generated in accordance with the embodiments discussed above are used for controlling the radar test system and/or the MRDs shown in FIGS. 7A and 7B. As will be appreciated by one of ordinary skill in the art having the benefit of the present disclosure, one likely vehicular radar is an automobile radar that is used in various capacities in current and emerging automobile applications. However, it is emphasized that the presently described radar test system 700 for testing vehicular radar is not limited to automobile radar systems, and can be applied to other types of vehicles including busses, motorcycles, motorized bicycles (e.g., scooters), and other vehicles that could employ a vehicular radar system (DV: or even other types of radars).

Referring to FIG. 7A, the radar test system 700 is arranged to test the radar under test 105 by receiving radar signals from the radar under test 105 and generating corresponding echo signals from emulated targets. The radar test system 700 may be used in conjunction with the system 100 for generating a trigger signal, discussed above, where the trigger signal may be used to control aspects of the emulation. In the depicted embodiment, the radar test system 700 includes multiple re-illuminators 706, each of which comprises at least one re-illumination antenna 708 (e.g., corresponding to the antenna 110 in FIG. 1) and at least one MRD 710. As described more fully herein, there is one re-illuminator for each emulated target. In an embodiment, the radar test system 700 may further comprise a diffractive optical element (DOE), configured to diffract electromagnetic waves of the radar signal incident on a first side of the DOE from the radar under test 105 to be received by the re-illuminators 706 on a second side of the DOE. Each diffracted wave would be focused on a respective one of the antennas 708, where the respective focal points (foci) at each of the antennas 708 represents a target to be emulated by the radar test system 700. The radar test system 700 is configured to receive PMCW radar signals (or FMCW radar signals) from the radar under test 105, which has multiple radar transmitters and corresponding transmit antennas.

The radar test system 700 also comprises a processing unit 770, which may be the same as the processing unit 170 discussed above with reference to FIG. 1. In the depicted embodiment, the processing unit 770 includes a controller 714, that may include a combination of a memory 716 that stores instructions and an illustrative processor 718 that executes the instructions in order to implement processes described herein. A database 720 may store information to be used for target emulation, including various predetermined scenarios, as well as parameters of a particular radar under test 105, such as codes, and fields of view (FOVs). The controller 714 may be housed within or linked to a workstation such as the processing unit 770 or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling an application of various principles as described in the present disclosure. The structural configuration of the controller may include, but is not limited to, processor(s), computer-usable/computer readable storage medium(s), an operating system, application module(s), peripheral device controller(s), slot(s) and port(s).

Additionally, although the processing unit 770 and/or the controller 714 shows components networked together, two such components may be integrated into a single system. For example, the processing unit 770 and/or the controller 714 may be integrated with a display (not shown) and/or with the radar test system 700. On the other hand, the networked components of the processing unit 770 and/or the controller 714 may also be spatially distributed such as by being distributed in different rooms or different buildings, in which case the networked components may be connected via data connections. In still another embodiment, one or more of the components of the processing unit 770 and/or the controller 714 is not connected to the other components via a data connection, and instead is provided with input or output manually such as by a memory stick or other form of memory. In yet another embodiment, functionality described herein may be performed based on functionality of the elements of the processing unit 770 and/or the controller 714 but outside the radar test system 700.

As discussed above with regard to the processing unit 170, the processing unit 770 and/or the controller 714 may include one or more computer processors, DSPs, FPGAs, ASICs, or combinations thereof, using any combination of hardware, software, firmware, hard-wired logic circuits, or combinations thereof. The processing unit 770 and/or the controller 714 may include its own processing memory for storing computer readable code (e.g., software, software modules) that enables performance of the various functions described herein. The processing memory and any other memory (and databases) described herein, including the memory 716 and the database 720, may be various types of RAM and/or ROM, including flash memory, EPROM, EEPROM, CD-ROM, DVD, registers, a hard disk, a removable disk, tape, floppy disk, blu-ray disk, USB driver, or any other form of storage medium known in the art, which are tangible and non-transitory computer readable storage media (e.g., as compared to transitory propagating signals). Memories may be volatile or non-volatile, secure and/or encrypted, unsecure and/or unencrypted, without departing from the scope of the present teachings.

While the various components of the radar test system 700 are described in greater detail in connection with representative embodiments below, a brief description of the function of the radar test system 700 is presented currently.

In operation, the radar under test 105 emits radar signals (illustratively mm wave signals) that are focused at a respective one of the antennas 708 of the MRDs 710, which as described more fully below, are beneficially comparatively high-gain antennas. For example, the radar test system 700 may include a DOE, as mentioned above. The emitted radar signals are incident on a first side of the DOE, which diffracts the signals from the radar under test 105 to be focused at a respective one of the antennas 708. As such, the DOE diffracts the incident wave at a particular angle relative to a second side of the DOE, and each diffracted waved is focused on a respective one of the antennas 708. Of course, the radar test system 700 may include other means of focusing the radar signals at respective ones of the antennas 708 of the MRDs 710, without departing from the scope of the present teachings. Notably, the respective focal points at each one of the antennas 708 represents a target that is emulated by the radar test system 700.

Again, each of the radar signals is incident on a respective one of the antennas 708 of the re-illuminators 706. The radar signals incident on the antennas 708 are provided to a respective one of the MRDs 710. As described more fully herein, based on input from the controller 714, pulse code modulation of the incident signals is effected in each of the MRDs 710 and beneficially emulates a distance of a target from the radar under test 105, or a velocity of a target relative to the radar under test 105, or both. Moreover, the azimuth (+x-direction in the coordinate system of FIG. 7A) and the elevation (+z direction in the coordinate system of FIG. 7A) are emulated by the antennas 708, which may be illustratively mechanically gimballed, or a combination of mechanical gimballing and electronic emulation. The re-illuminated signals provided by the MRDs 710 are incident on the radar under test 105. The processing unit 770 receives the signals from the radar under test 105 for further analysis of the accuracy of the radar under test 105.

Referring to FIG. 7B, the MRD 710 is connected to a re-illumination antenna 708, and which may be one of the re-illumination antennas described above. Of course, in practice, there is more than one MRD 710 in a system, and thus more than one re-illumination antenna 708 (e.g., as depicted in the representative embodiment of FIG. 7A). In certain representative embodiments, the re-illumination antenna 708 is a horn antenna selected for the wavelength of signals received from the radar under test 105. The re-illumination antenna 708 may have a variable gain, and may be coupled to a beamshaping element, such as a lens to tailor a degree of freedom of an AoA, as noted above. The horn or similar antenna for re-illumination antenna 708 is not essential, and other types of antennas, such as patch antennas or patch antennas arrays (described below), may be incorporated without departing from the scope of the present teachings.

In the depicted embodiment, the MRD 710 comprises a circulator 702 connected to a mixer 703. The mixer 703 is an I/Q mixer or I/Q modulator, which is beneficially a single-sideband I/Q mixer, with standard 90° phasing of the RF signal, resulting in an output of either the upper sideband (USB) or the lower sideband (LSB), rejecting the LSB or USB, respectively. Alternatively, the I/Q mixer 703 may be adapted for binary phase modulation (BPM), quaternary phase modulation (QPM), 8-phase modulation, 16-QAM, and the like. The modulation may be selected to provide the desired degree of approximation of the difference phase symbols. Notably, approximation of the amplitude can be carried out by the I/Q mixer 703 using techniques within the purview of the one of ordinary skill in the art.

The output of the I/Q mixer 703 is provided to a variable gain amplifier (VGA) 704, which comprises a gain control input 705. As alluded to above, the gain control input 705 of the VGA 704 is connected to the processing unit 770. Notably, the VGA 704 enables proper emulation of the re-illuminated signal received from the radar under test 105 at the re-illumination antenna 708. For example, when a DOE is involved, as noted above, the incident signal from the radar under test 105 on the DOE is split among the number of foci at the re-illumination antennas 708. As such, upon diffraction by the DOE, the power of the radar signal is split, and therefore the power of each radar signal diffracted to the multiple foci at the re-illumination antennas 708 is reduced compared to the output power of the radar signal from the radar under test 105. Moreover, as noted above, the portion (and thus the power) of the radar signal diffracted from foci on the side of the DOE facing the re-illumination antennas 708 depends on the orientation of the re-illumination antennas 708 relative to one or more foci at the re-illumination antennas 708. As such, the power of the signal incident on the re-illumination antennas 708 may be insufficient for re-transmission back to the radar under test 105, and thus for accurate testing. Moreover, the power of the re-illuminated signal from the re-illumination antennas 708 is an indication of the emulated distance between an emulated target and the radar under test 105. As such, the gain provided by the VGA 704 is selected at the gain control input 705 based on the power of the radar signal incident on the re-illumination antennas 708, and the desired emulation distance of the target being emulated.

Notably, power is used to emulate consistent radar cross-section (RCS). The RCS can be stored in look-up in tables in database 720, for example. To this end, for a given range r, it is known that the return signal is proportional to RCS and falls as $1/r^4$. A vehicle is typically quoted as being 10 dBsm, which is radar speak for measuring area, meaning 10 dB relative to a square meter (s.m.), or in plain English, 10 square meters. Many objects have been tabulated (people, bicyclists, buildings, etc.), and those that have not can be calculated these days by ray tracing techniques. By the present teachings, emphasis is placed on providing a return signal strength to the radar under test 105 that is commensurate with the distance r (obeying the well-known $1/r^4$ radar decay law) and the accepted value of RCS for the particular object. In accordance with a representative embodiment, the signal strength (and thus power) is adjusted by adjusting the strength of the I/Q drive signals from the processing unit 770 to the MRDs 710, with a weaker I/Q drive signal providing a comparatively weaker emulation signal. Notably, in certain representative embodiments, the processing unit 770 pre-computes the consistent return signal provided to the single point of focus at the radar under test 105, and the controller 714 then adjusts the strength of the I and Q drives to achieve this SSB strength. Alternatively, and beneficially, the gain of VGA 704 can be adjusted to control return SSB strength.

When the vehicular radar is an FMCW device, the distance/velocity is emulated electronically using the MRD 710. To this end, FMCW radar systems use chirped waveforms, whereby the correlation of the original transmit (Tx) waveform from the radar under test 105 with the received (Rx) echo waveform reveals the target distance. For example, in upchirp/downchirp systems with chirp rates of $\pm k_{sw}$ (measured in Hz/sec), a target at a distance d and zero relative velocity to the ego vehicle will result in a frequency shift ($\delta f$) given by Equation (1), where c is the speed of light and the factor of 2 is due to the roundtrip propagation of the signal from the radar under test 105:

$$\delta f = -(\pm 2k_{sw}d/c) \qquad \text{Equation (1)}$$

The sign of the shift depends on which part of the waveform, upchirp vs. downchirp, is being processed. In contrast, Doppler shifts due to relative velocity manifest as "common mode" frequency shifts; e.g., a net upshift over both halves of the waveform indicates the radar DUT is approaching closer to the target. Correlation is performed in the DUT's IF/baseband processor; bandwidths of a few MHz are typical.

The most commonly deployed variation of FMCW uses repetitive upchirps, or repetitive downchirps, but not both (with intervening dead times). As such, the distance to a target is determined as in the previous paragraph, now without the sign issue. Relative velocity is determined by measuring the phase shift between successive frame IF correlation signals, where frame is a term of art for one period of the waveform. In many FMCW radar applications, the frame repetition rate is typically a few kHz.

One known approach introduced the concept of receiving a transmit signal from a radar DUT at one or more probe points, then applying bipolar phase modulation to the received signal, before returning the signal back to the radar DUT. Because phase modulation is another form of frequency modulation, bipolar phase modulation of such a known system results in a double sideband (DSB) modulation of the original signal, suppressing the original swept carrier. Bipolar phase modulation is rather easy to implement because one can simply switch between an open and a short load. If the modulation frequency is $\delta f^*$, and the original signal's time-dependent frequency is f(t), then due to comparatively slow chirp rates, the time-dependent frequency of the return signal is $f(t) \pm \delta f^*$. Equation (2) is derived from Equation (1) replacing d with a difference between a target distance of $d_{em}$ and a setup distance of $d_{su}$, which is the physical distance between the radar under test 105 and the antenna 108 of one of the re-illuminators 106:

$$\delta f^* = 2k_{sw}(d_{em} - d_{su})/c \qquad \text{Equation (2)}$$

Due to DSB modulation, for every intentionally created target j at distance $d_{em,j}$, a twin ghost target may also be created at distance $d_{em,j} \pm 2d_{su,j}$, where $d_{su,j}$ is the setup distance to probe j, where the sign in the "ghosting equation" depends on the sign of the chirp slope. The method herein also suppresses such a ghost target.

Upon amplification/attenuation at the circulator 702, the MRD 710 provides an amplified/attenuated SSB signal that is returned to the circulator 702 and retransmitted out the re-illumination antenna 708. Notably, in the SSB MRD 710 of the representative embodiment, decreasing the strength of the modulation I and Q drive signals will decrease the output tone strength and thus decrease the RCS. In practice, this method likely will not achieve more than 15-20 dB of dynamic range by modulation drive alone. However, the VGA 704 makes up the deficit to achieve the desired RCS dynamic range, and 10-50 dB of variable gain can be readily achieved by a combination of variable attenuators and amplifier bias adjustment.

The I/Q mixer 703 of the MRD 710 is driven by an approximated difference phase symbol stream to provide an I-Q modulation phase. The I-Q modulation phase adds to the received resultant phase at the re-illumination antenna 708, and thereby approximately reconstructs the resultant stream at the later emulated delay time. So, the known PMWC radar signal (resultant phase symbol stream) at the setup point of the MRD 710 is changed to indicate the PMWC radar signal at the emulated target point.

In an embodiment, the MRD 710 may further include a direct digital synthesizer (DDS) (not shown) for providing the I/Q signals to the I/Q mixer 703 for implementation of multitone modulation. The DDS would provide multiple frequency offset sidebands from the chirping carrier, which are used to emulate multiple target distances for targets at the same target angle. So, for example, when the chirp rate is $k_{sw}$, then the desired offset frequency $\delta f^*$ is $2k_{sw}(d_{em} - d_{su})/c$, per Equation (1) above. Hence, for multiple targets at $d_{em1}, d_{em2}, \ldots, d_{emi}$, SSB modulation is performed at $\delta f_1^* = 2k_{sw}(d_{em1} - d_{su})/c$, $\delta f_2^* = 2k_{sw}(d_{em2} - d_{su})/c$, etc.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of generating a trigger signal from a radar signal received over the air from a radar under test, the method comprising:

detecting power levels of the radar signal received from the radar under test at a radio frequency (RF) power detector, the radar signal comprising a plurality of bursts of RF energy in a burst pattern, wherein each burst of RF energy has a chirp slope corresponding to a rate of frequency change with respect to time;

identifying a plurality of repeating radar frames in the radar signal from the burst pattern using the detected power levels of the radar signal, wherein each radar frame comprises at least one burst of the plurality of bursts of RF energy; and creating a plurality of trigger signals corresponding to the plurality of radar frames, respectively, by synchronizing to the at least one burst in each radar frame.

2. The method of claim 1, wherein detecting the power levels of the radar signal comprises:

determining voltages proportional to power levels of the radar signal; and comparing the determined voltages to a reference voltage to provide a voltage waveform comprising pulses corresponding to the plurality of bursts of the radar signal.

3. The method of claim 2; wherein creating the plurality of trigger signals from the plurality of radar frames comprises:

delaying rising and falling edges of the voltage waveform pulses; and creating trigger signals using a logic circuit based on timing of the rising and falling edges of the voltage waveform pulses.

4. The method of claim 1, wherein creating the plurality of trigger signals from the plurality of radar frames comprises:

generating rising and falling edge timestamps corresponding to the rising and falling edges of the voltage waveform pulses, respectively; and driving a finite state machine with the rising and falling edge timestamps to generate the trigger signals.

5. The method of claim 1, further comprising:

adjusting a local oscillator (LO) frequency of a radar target emulation receiver in response to the chirp slopes of the at least one burst in each radar frame synchronized by the trigger signal, wherein an LO signal at the adjusted LO frequency is mixed with the radar signal to provide an LO-shifted echo signal, wherein the radar under test receives the LO-shifted echo signal, and uses it to determine at least a distance to an emulated target.

6. The method of claim 5, wherein the radar under test mixes the LO-shifted echo signal with a local LO signal to provide an adjusted intermediate frequency (IF) signal that is applied to change at least one of the distance, a velocity and an angle to the emulated target.

7. A method of generating a trigger signal from a radar signal received over the air from a radar under test, the method comprising:

detecting power of the radar signal received from the radar under test, the radar signal comprising at least a first burst of radio frequency (RF) energy having frequency chirps with a first chirp slope corresponding to a first rate of frequency change with respect to time and a second burst of RF energy having frequency chirps with a second chirp slope corresponding to a second rate of frequency change with respect to time different from the first chirp slope;

identifying a radar frame in the radar signal comprising the first burst and the second burst using the detected power of the radar signal; and creating a trigger signal corresponding to the radar frame by synchronizing to the first and second bursts.

8. The method of claim 7, wherein identifying the radar frame comprises performing pattern recognition based on timing of the first burst and the second burst.

9. The method of claim 7, wherein detecting the power of the radar signal comprises:

determining voltages proportional to the detected power; and comparing the voltages to a reference voltage to provide a voltage waveform comprising pulses corresponding to the first and second bursts, respectively.

10. The method of claim 9, wherein creating the trigger signal from the radar frame comprises:

delaying rising and falling edges of the voltage waveform pulses; and creating the trigger signal using a logic circuit based on timing of the rising and falling edges of the voltage waveform pulses.

11. The method of claim 9, wherein creating the trigger signal from the radar frame comprises:

generating rising and falling edge timestamps corresponding to the rising and falling edges of the voltage waveform pulses, respectively; and driving a finite state machine with the rising and falling edge timestamps to create the trigger signals.

12. The method of claim 7, wherein detecting power of the radar signal comprises:

receiving the radar signal at a radio frequency (RF) power detector operating at an RF frequency corresponding to a frequency of the radar signal; and outputting a voltage from the RF power detector proportional to the power of the received radar signal.

13. The method of claim 7, wherein detecting power of the radar signal comprises:

receiving the radar signal;

down-converting the received radar signal to an intermediate frequency (IF) signal; and receiving the IF signal at a radio frequency (RF) power detector operating at an RF frequency corresponding to a frequency of the IF signal; and outputting a voltage from the RF power detector proportional to the power of the received IF signal as the power of the radar signal.

14. The method of claim 7, wherein a first burst pattern is a long-range burst pattern, and a second burst pattern is a medium range burst pattern.

15. A system for generating a trigger signal from a radar signal received over the air from a radar under test, the radar signal comprising a plurality of bursts of RF energy in a burst pattern, the system comprising:

a power detector configured to detect power of the radar signal received from the radar under test, wherein the power detector outputs DC voltage levels proportional to power levels of the radar signal;

an edge detecting circuit configured to receive the DC voltage levels output by the power detector, to provide a voltage waveform comprising pulses corresponding to the DC voltage levels indicating RF energy bursts of the radar signal, and to detect edges of the voltage waveform pulses, wherein each burst of RF energy has a chirp slope corresponding to a rate of frequency change with respect to time; and a trigger generator configured to identify a plurality of radar frames of the radar signal based on the detected edges, and to automatically generate trigger signals indicating the radar frames, respectively, by synchronizing to at least one of the detected edges of the voltage waveform pulses for each radar frame, wherein each radar frame comprises at least one of the RF energy bursts.

16. The system of claim 15, wherein the trigger generator comprises an analog circuit configured to delay at least one of a rising edge or a falling edge of the voltage waveform pulses in each radar frame to obtain at least one of a rising edge pulse or a falling edge pulse, and to output the trigger signals in response to the delayed at least one of the rising edge pulse or the falling edge pulse.

17. The system of claim 15, wherein trigger generator comprises a digital circuit comprising a digital counter configured to generate timestamps corresponding to rising and falling edges of the voltage waveform pulses, respectively; and a finite state machine driven by the timestamps to generate the trigger signals.

18. The system of claim 15, further comprising:
a downconverter configured to downconvert a frequency of the radar signal to a downconverted frequency, wherein the power detector detects power of the radar signal at the downconverted frequency.

19. The system of claim 15, wherein the edge detecting circuit comprises a comparator configured to compare the DC voltage levels from the power detector to a reference voltage to provide the voltage waveform.

20. The system of claim 15, wherein the radar signal comprises one of an FMCW radar signal, a PMCW radar signal, or a pulsed radar signal.

* * * * *

UNITED STATES PATENT AND TRADEMARK OFFICE
CERTIFICATE OF CORRECTION

| | | |
|---|---|---|
| PATENT NO. | : 11,555,887 B2 | Page 1 of 1 |
| APPLICATION NO. | : 16/836146 | |
| DATED | : January 17, 2023 | |
| INVENTOR(S) | : Dieter W. Vook et al. | |

It is certified that error appears in the above-identified patent and that said Letters Patent is hereby corrected as shown below:

In the Claims

In Column 22, Line 54, in Claim 15, after "outputs" delete "DC".

In Column 22, Line 56, in Claim 15, after "the" delete "DC".

In Column 22, Line 59, in Claim 15, after "the" delete "DC".

In Column 23, Line 25, in Claim 19, before "voltage" delete "DC".

Signed and Sealed this
Twenty-first Day of March, 2023

*Katherine Kelly Vidal*
Katherine Kelly Vidal
*Director of the United States Patent and Trademark Office*